June 18, 1963   A. J. WILDMAN   3,094,665
MEANS FOR THE DETECTION OF SIGNALS IN THE PRESENCE OF NOISE
Filed April 27, 1959   2 Sheets-Sheet 1

INVENTOR
ALAN J. WILDMAN
BY
ATTORNEY

United States Patent Office 3,094,665
Patented June 18, 1963

3,094,665
MEANS FOR THE DETECTION OF SIGNALS IN THE PRESENCE OF NOISE
Alan J. Wildman, Santa Barbara, Calif., assignor to Raytheon Company, Lexington, Mass., a corporation of Delaware
Filed Apr. 27, 1959, Ser. No. 809,311
8 Claims. (Cl. 325—475)

This invention relates generally to radio or radar receivers and, more particularly, to devices for detecting electrical signals in the presence of undesired noise, said noise arising either externally to or within the receiver itself.

In radio or radar receivers, it is difficult to detect the presence of desired signal voltages when they are accompanied by undesirable noise voltages. Such noise fluctuations may be generated because of atmospheric disturbances or other effects external to the receiver system or because of the inherent noise characteristics of the components which make up the receiver itself.

It is desirable, therefore, to obtain a receiver which detects and substantially separates in some way the desired information signal from the undesired noise fluctuation. Signal systems which attempt to do this may be substantially complicated and require elaborate filtering schemes to remove noise components without removing signal content. Moreover, many such systems require adjustments of their sensitivity when overall noise levels change.

This invention, however, discloses a signal detection system which is relatively simple in construction and which provides a constant detection sensitivity in terms of the signal to noise ratio without the need of external adjustments. The invention compares the peak value of the combined noise and signal input voltage with a voltage proportional to average value of said combined noise and signal input voltage. Gating means are provided to produce an output signal only when the peak value of a signal pulse exceeds the average noise level by a predetermined ratio. The invention, thus, can detect the presence of weaker signals when the noise level is low as long as the signal level is at least a fixed multiple of the noise level.

Such a system may be used, for example, in a receiver which is to be automatically tuned through a wide band of frequencies for the purpose of detecting the presence of many signals of as different kinds as possible. In addition, the invention may be used with fixed tuned receivers for providing a constant signal detection capability without the need of adjustment in spite of variations in the average noise level caused by changes in the amplifier gains, environmental changes, or the like. The invention may be most easily understood with the help of the drawing in which.

The principle of operation of the invention is based upon the characteristic properties of random noise. Although it is not possible to predict the values of particular instantaneous amplitudes of a random noise voltage, it is possible to predict the relative frequency of occurrence of different amplitudes of a random noise voltage. These relative frequencies of occurrence are governed by the laws of probability. For example, it is known by such laws that large values of the instantaneous amplitudes of random noise occur relatively rarely. Thus, the probability is very small that a noise voltage will have an instantaneous amplitude that is substantially greater than the average values of the noise amplitude.

This invention takes advantage of this fact by providing a means for comparing the instantaneous value of the input voltage with a substantially direct voltage that is proportional to the average value of the alternating fluctuations of the input voltage. If, at a particular instant of time, the input voltage contains a signal pulse whose amplitude is substantially greater than this direct voltage and, hence, exceeds the average value by a predetermined ratio, a biased gating means is triggered to provide an output pulse at the time that the instantaneous signal pulse occurs. Thus, the presence of the signal pulse may be detected with a relatively high degree of reliability since a noise pulse of large amplitude will occur only extremely rarely and, consequently, will trigger the gating circuit only extremely rarely.

Figure 1:
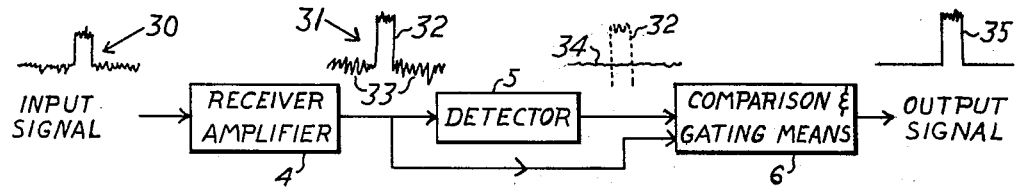
FIG. 1 shows a block diagram of a signal detection system which utilizes a particular embodiment of the invention.

FIG. 1 shows a general block diagram of the invention in which an input signal 30 is applied to a receiver amplifier 4 which provides an amplified input signal 31 to a detector 5. Signal 31 contains, for example, both a desired information signal pulse 32 and undesired noise fluctuations 33. Detector 5 provides a means for averaging the instantaneous value of the input signal to produce a substantially direct voltage 34 the level of which is proportional to the average value of the input signal amplitudes. Voltage 34 is shown compared with input signal pulse 32 (shown in dashed lines) at the output of detector 5. The combined information and noise signal input 31 from amplifier 4 and the output 34 of detector 5 are each fed to comparison and gating means 6 where the instantaneous value of signal 31 is compared to the value of the substantially direct voltage 34 from detector 5. When the instantaneous value of the signal input voltage is large enough with respect to the average value so as to exceed the bias voltage 34, the gating means provides an output signal 35 which is representative of the information signal voltage 32 originally contained in the input signal.

Figure 2:
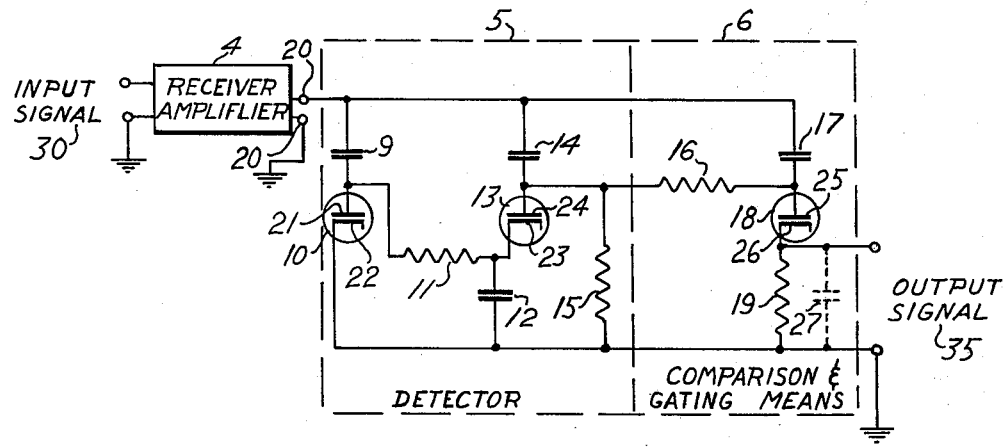
FIG. 2 shows a partial block diagram and partial schematic diagram of one particular embodiment of the detection system of the invention.

A circuit configuration representing a particular embodiment of such a block diagram is shown in FIG. 2 in which input signal 30 is fed to receiver amplifier 4 which provides an amplified signal at its output terminals 20 which contains both the desired information signal and the undesired noise signal. The signal appearing at terminals 20 is equivalent to signal 31 of FIG. 1 and is fed to the detector system 5 shown in FIG. 2 as enclosed by the dashed lines. The signal is fed to plate 21 of a diode 10 through a capacitor 9. Cathode 22 of diode 10 is connected to ground. Plate 21 of diode 10 is connected to cathode 23 of diode 13 through resistor 11. Cathode 23 is connected to ground through capacitor 12. The signal at terminals 20 is also connected to plate 24 of diode 13 through capacitor 14. The output signal of the detector 5 is provided across resistor 15 connected from plate 24 of diode 13 to ground. As explained in subsequent paragraphs, the signal at the plate of diode 13 represents a direct voltage, the level of which is proportional to the average value of the signal appearing at terminals 20 of receiver amplifier 4. The signal at the plate of diode 13 is fed to plate 25 of diode 18 through resistor 16. The signal from receiver amplifier 4 is also fed to the plate of diode 18 through a capacitor 17. Cathode 26 of diode 18 is connected through resistor 19 to ground. The output voltage 35 is taken across resistor 19 in the cathode circuit of diode 18. The comparison and gating means is shown enclosed by dashed lines 6.

The operation of the circuit shown in FIG. 2 is explained as follows. The detector section of the invention comprises the two cascaded shunt rectifiers 10 and 13. During positive input voltage excursions, diode 10 conducts and a voltage which is negative with respect to ground is developed at the junction of capacitor 9 and plate 21 of diode 10. This voltage is filtered by the resistance-capacitance combination of resistor 11 and capacitor 12 and the filtered voltage is applied to the cathode of diode 13. During positive voltage excursions, diode 13 conducts and a voltage which is negative with respect to cathode 23 of diode 13 is similarly developed at the junction of capacitor 14 and plate 24 of diode 13. The sum of these two voltages, both developed from positive input voltage excursions, provides a voltage across resistor 15. The voltage across resistor 15 is essentially a direct voltage which is proportional to the average value of the positive alternating components of the combined signal and noise input. According to the laws of probability, if the characteristic of the noise input is essentially random and the general noise level remains substantially the same, the voltage value appearing across resistor 15 will remain substantially the same. The voltage value appearing across resistor 15 will rise or fall depending upon the general level of the noise existing at the output of receiver amplifier 4.

The voltage across resistor 15 is applied to plate 25 of diode 18 through resistor 16 and, thus, provides a negative bias voltage at this point. This value is then compared with the instantaneous value of the signal produced at the output terminals 20 of receiver 4 which is applied to plate 25 through capacitor 17. If the instantaneous value of the combined signal and noise voltage from terminals 20 is not greater than the voltage from detector 5, diode 18 will not conduct and no output will appear across resistor 19. However, if signal peaks, or rarely occurring strong noise peaks, are greater than the bias voltage at plate 25, diode 18 will conduct and a voltage pulse, as shown by output signal 35 of FIG. 1, will be produced across load resistor 19 in the cathode circuit of the diode 18. If it is desired, a capacitor 27 (shown in dashed lines in FIG. 2) may be shunted across load resistor 19 in order to provide the additional capability of stretching the output pulse in cases where the signal pulses to be detected are of very short duration.

In FIG. 2, diode 13 delays the start of the discharge of capacitors 9 and 12 and may undesirably cause the discharge time constant to be too great for the desired application. Because the time constant limits the rate of change of noise level which can be followed and also limits the maximum signal pulse repetition rate which can be handled due to a slower recovery between pulses, it may be desirable to reduce the time constant by an appropriate amount. Such a reduction may be brought about by placing a resistor across diode 10 in FIG. 2, which loads diode 10 and reduces the discharge time constant to allow the input signal to be more easily followed and to provide more rapid recovery between pulses.

The circuit configuration shown in FIG. 2 is capable of operation with positive-going signals. It is obvious, however, that this circuit configuration may be modified to provide operation for negative-going signals by reversing the polarities of diodes 10, 13, and 18.

Figure 3:
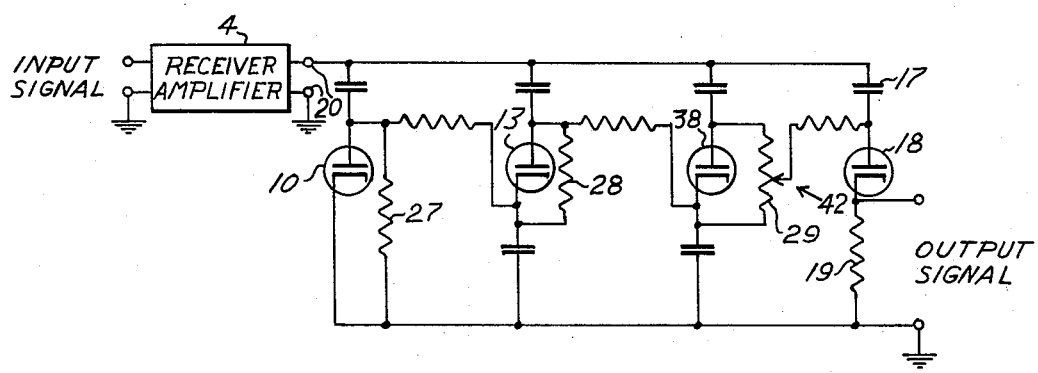
FIG. 3 shows a partial block diagram and partial schematic diagram of a more elaborate embodiment of the signal detection system of the invention utilizing adjustable gating means.

It may be desirable to cascade additional rectifying stages in detector 5 if, for instance, relatively inefficient diodes are used or very wide band widths are involved. Such an elaborated circuit configuration may be as shown in FIG. 3 in which an additional diode 38 is used following diodes 10 and 13. The circuit configuration of FIG. 3 also includes a potentiometer 42 which may be used to adjust the bias of tube 18 initially as required for a particular application.

As explained above in connection with the circuit shown in FIG. 2, it may be desirable to reduce the time constants of each of the detector stages to allow the detector to follow the incoming signal and provide short enough recovery time for the pulse repetition rate used. Since more stages are involved in the circuit shown in FIG. 3, this problem may be more acute for this circuit than for the circuit shown in FIG. 2. Thus, in FIG. 3 there are shown resistors 27, 28, and 29 connected directly across diodes 10, 13, and 38 respectively. Each of these resistors loads only its associated rectifier and prevents unwarranted stretching of the discharge time constant at each stage.

It can be seen from the circuits of FIGS. 2 and 3 that it is not necessary for the receiver amplifier 4 to amplify the D.-C. component of the combined input signal and noise voltage. A very low level detector may be used if it is followed by sufficient A.-C. amplification. Because the voltage from detector 5 is applied as a bias on gating tube 18 at the same terminal as the input signal is applied, the possibility that the ripple voltage from the bias rectification will appear at the output terminal is avoided.

Figure 4:
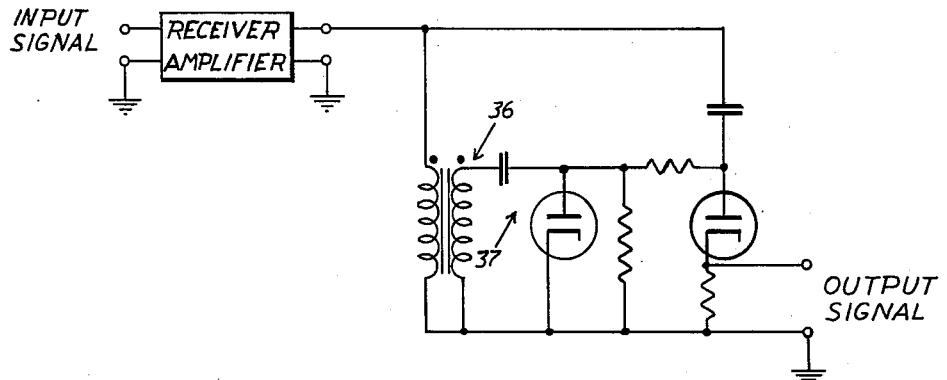
FIG. 4 shows a partial block diagram and partial schematic diagram of another particular embodiment of the invention utilizing a transformer and a single rectification stage.

For most applications, a single stage of diode rectification may not be sufficient to provide enough bias at the gating diode to work satisfactorily. For this reason, FIGS. 2 and 3 show the use of at least two stages of rectification. The invention, however, is not necessarily to be limited in this way. A circuit utilizing one diode may be feasible if used in conjunction with a step-up transformer as shown in FIG. 4. In that figure, transformer 36 has its primary side connected across the output of receiver amplifier 4 and its secondary side connected to a rectifier stage 37. It has been observed that such a configuration, while being entirely feasible, may not operate as successfully as a multiple diode arrangement in that the transformer may excessively load the receiver amplifier which drives it.

Figure 5:
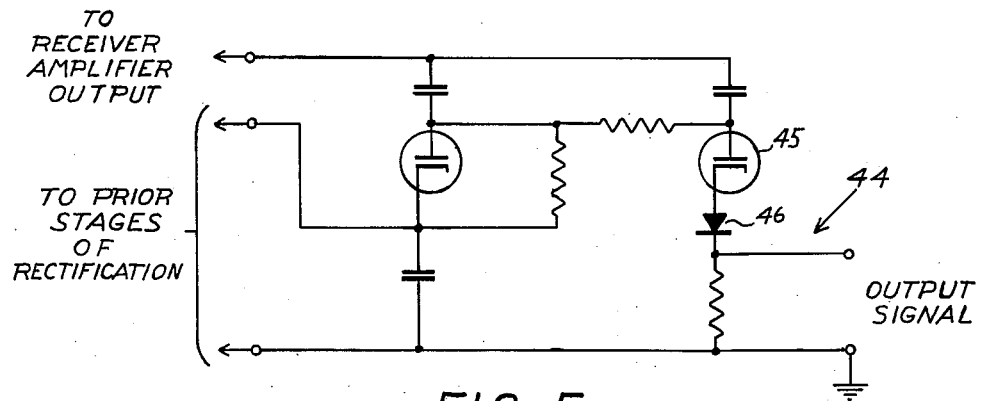
FIG. 5 shows a schematic diagram of a particular embodiment of the gating section of the invention utilizing two diodes connected in series.

The configurations shown in FIGS. 2–4 utilize a single gating diode in the output circuit. The invention need not be limited to such a configuration but may utilize a pair of diodes connected in series to provide better operation for some applications. In FIG. 5, there is shown such an output circuit utilizing a tube diode 45 and a crystal diode 46 connected in series in the output stage 44. For some applications, it has been observed that the tube diode used in the gating circuit may have such high shunt capacitance that capacitive coupling of noise to the output may result. For this reason, in FIG. 5 crystal diode 46 is connected in series with tube diode 45. Crystal diode 46 has a very low shunt capacitance and, thereby, provides much less capacitive coupling of noise to the output. In many cases, however, a crystal diode may not have a high enough reverse voltage capability and, for this reason, may not be usable in some applications merely as a substitute for the tube diode. Hence, in FIG. 5, tube diode 45 is retained in series to take most of the back voltage.

Figure 6:
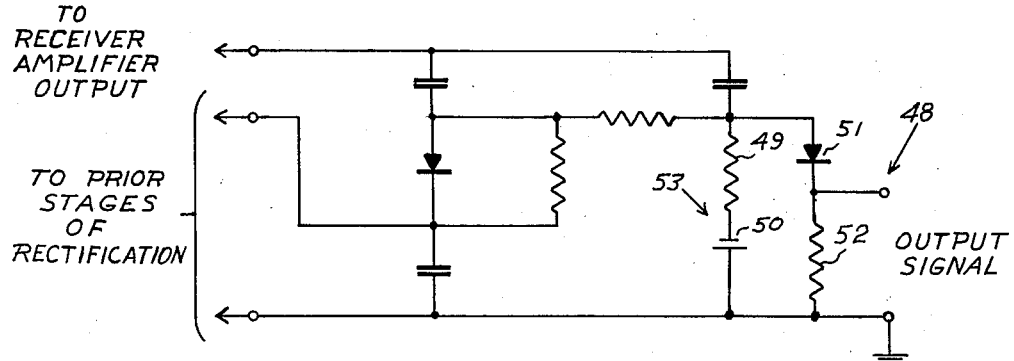
FIG. 6 shows another particular embodiment of the gating circuit of the invention having means for linearizing the operation of the system at lower input noise levels.

Another variation in the output circuit of the invention is shown in FIG. 6 wherein output stage 48 has a series circuit 53 connected across gating diode 51 and output resistor 52. Series circuit 53 comprises a resistor 49 and a biasing source 50. At lower input noise levels, the series circuit provides a linearizing effect by introducing a bias which compensates partially for the square-law curvature of the rectification characteristic. Thus, the range of applicability of the invention is extended to lower input noise levels.

As an example of the effectiveness of circuits utilizing the invention, the following performance characteristics have been observed. The circuit of the invention reliably detected signals having a pulse width of one microsecond at a pulse repetition rate of 5 kilocycles per second. The pulse signals were at least 14.4 to 15.2 db stronger than the root-mean-square noise level over the input noise level range of .35 volt peak to 1.4 volts peak. It was noted that triggering of the biased gating means due to noise peaks occurred approximately once in every five-minute interval. The effectiveness of the circuit is, thus, amply demonstrated.

Although employing rectifiers, the invention does not require amplifying devices. Because diodes are used, operating characteristics are more reliable than circuits using multi-element vacuum tubes or transistors. The device is capable of fast operation for the detection of short duration signals. Configurations other than those shown in the figures may be devised by those skilled in the art without limiting the scope of this invention. Hence, this invention is not to be construed as limited by the particular embodiments shown and described herein except as defined by the appended claims.

What is claimed is:

1. Means for detecting a signal in the presence of noise comprising means for receiving an input signal; a plurality of rectifying means connected to said receiving means and responsive to said input signal for producing a first voltage the value of which is greater than and substantially proportional to the average value of the instantaneous peak values of said input signal; means connected to said receiving means and to said first voltage producing means and responsive to said first voltage and to said input signal for comparing said first voltage with said instantaneous values of said input voltage and for producing an output voltage at those instants in time when said instantaneous values of said input voltage exceed said first voltage.

2. Means for detecting a signal in the presence of noise comprising means for receiving an input signal; first diode means connected to said receiving means and responsive to said input signal for producing a first substantially direct voltage, second diode means connected to said first diode means and to said receiving means and responsive to said first direct voltage to said input signal for producing a second substantially direct voltage the value of which is greater than and substantially proportional to the average value of the instantaneous peak values of said input signals; means connected to said receiving means and to said second direct voltage producing means and responsive to said second direct voltage and to said input signal for comparing said second direct voltage with said instantaneous values of said input voltage and for producing an output voltage at those instants in time when said instantaneous values of said input voltage are greater than said second direct voltage.

3. Means for detecting a signal in the presence of noise comprising means for receiving an input signal; first diode means connected to said receiving means and responsive to said input signal for producing a first substantially direct voltage, second diode means connected to said first diode means and to said receiving means and responsive to said first direct voltage and to said input signal for producing a second substantially direct voltage the value of which is greater than and substantially proportional to the average value of the instantaneous peak values of said input signal; third diode means connected at the same point to said receiving means and to said second diode means and responsive to said second direct voltage and to said input signal for comparing said second direct voltage with said instantaneous values of said input voltage and for producing an output voltage at those instants in time when said instantaneous values of said input voltage exceed said second voltage by a predetermined ratio.

4. Means for detecting a signal in the presence of noise comprising means for receiving an input signal; means connected to said receiving means and responsive to said input signal for producing a first substantially direct voltage the value of which is substantially equal to a predetermined multiple of the average value of the instantaneous peak values of said input signal, said first voltage producing means including first rectifying means connected to said receiving means, second rectifying means connected to said first rectifying means and to said receiver means, and variable impedance means connected to said second rectifying means for adjusting the value of said first substantially direct voltage; third rectifying means connected to said receiving means and to said variable impedance means and responsive to said first substantially direct voltage and to said input signal for comparing said predetermined multiple of said average voltage with said instantaneous values of said input voltage and for producing an output voltage at those instants in time when said instantaneous values of said input voltage are greater than said predetermined multiple of said average voltage.

5. Means for detecting a signal in the presence of noise comprising means for receiving an input signal; a first plurality of rectifying means connected to said receiving means and responsive to said input signal for producing a first voltage the value of which is greater than and substantially proportional to the average value of the instantaneous peak values of said input signal; gating means including a second plurality of rectifying means connected in series, said gating means connected to said receiving means and to said first voltage producing means and responsive to said first voltage and to said input signal for comparing said first voltage with said instantaneous values of said input voltage and for producing an output voltage at those instants in time when said instantaneous values of said input voltage exceed said first voltage.

6. Means for detecting a signal in the presence of noise comprising means for receiving an input signal; a plurality of rectifying means connected to said receiving means and responsive to said input signal for producing a first voltage the value of which is greater than and substantially proportional to the average value of the instantaneous peak values of said input signal; diode gating means connected to said receiving means and to said first voltage producing means and responsive to said first voltage and to said input signal for comparing said first voltage with said instantaneous values of said input voltage and for producing an output voltage at those instants in time when said instantaneous values of said input voltage exceed said first voltage, linearizing means connected to said gating means comprising biasing means and resistive means for providing linear operation of said gating means for low level values of noise voltage.

7. Means for detecting a signal in the presence of noise, comprising means for receiving an input signal; gating means for passing such input signal as an output signal thereof; rectifier means connected to said receiving means responsive to such input signal for producing a voltage the value of which is greater than and substantially proportional to the average value of the instantaneous peak values of such input signal; means for applying such input signal in unmodified form to said gating means, and means for applying the output of said rectifier means to said gating means in polarity opposition with respect to such input signal to effect passage of such input signal through said gating means only upon the occurrence of an instantaneous input signal greater in absolute magnitude than such average value of input signal.

8. Means for detecting a signal in the presence of noise in accordance with claim 7, wherein said rectifier means comprises a transformer means connected to said receiving means and rectifying means connected to the output of said transformer means.

References Cited in the file of this patent

UNITED STATES PATENTS

| | | |
|---|---|---|
| 2,240,490 | Cawein | May 6, 1941 |
| 2,259,520 | Freeman | Oct. 21, 1941 |
| 2,428,011 | Chatterjea et al. | Sept. 30, 1947 |
| 2,916,618 | Adams et al. | Dec. 8, 1959 |
| 2,963,653 | Campbell | Dec. 6, 1960 |

OTHER REFERENCES

Radio News: October 1932; page 216, Eliminating "Between-Station Noise," by W. O. Smith.